(12) United States Patent
Jones

(10) Patent No.: US 7,976,089 B2
(45) Date of Patent: Jul. 12, 2011

(54) TAILGATE TOPPER

(76) Inventor: Marcus A. Jones, Mooresville, NC (US)

( * ) Notice: Subject to any disclaimer, the term of this patent is extended or adjusted under 35 U.S.C. 154(b) by 0 days.

(21) Appl. No.: 11/763,433

(22) Filed: Jun. 14, 2007

(65) Prior Publication Data

US 2008/0309110 A1    Dec. 18, 2008

(51) Int. Cl.
  *B60P 3/00*    (2006.01)
  *B62D 33/00*    (2006.01)

(52) U.S. Cl. .......... 296/36; 296/57.1; 224/405; 410/121

(58) Field of Classification Search .............. 296/50, 296/57.1, 3, 32, 36; 224/402, 403, 405; 410/77, 410/121, 122, 143
See application file for complete search history.

(56) References Cited

U.S. PATENT DOCUMENTS

| | | | |
|---|---|---|---|
| 427,618 A | 5/1890 | Sahm | |
| 1,710,944 A | 4/1929 | Olsen | |
| 4,114,944 A | 9/1978 | Joynt et al. | |
| 5,727,838 A * | 3/1998 | Vallerand | 296/180.1 |
| 5,732,995 A | 3/1998 | Piccariello | |
| 5,788,311 A | 8/1998 | Tibbals | |
| 5,820,193 A | 10/1998 | Straffon | |
| 6,213,530 B1 | 4/2001 | Bohannon | |
| 6,322,304 B1 * | 11/2001 | Chasen | 410/120 |
| 6,343,826 B2 | 2/2002 | Bohannon | |
| 6,364,392 B1 | 4/2002 | Meinke | |
| 6,698,810 B1 * | 3/2004 | Lane | 296/3 |
| 6,761,387 B2 * | 7/2004 | Sloss | 296/3 |
| 6,932,404 B2 | 8/2005 | Vejnar | |
| 6,935,671 B2 | 8/2005 | Bruford et al. | |
| 6,957,840 B1 | 10/2005 | Endres | |
| 6,966,595 B2 | 11/2005 | Bruford et al. | |
| 6,988,756 B1 | 1/2006 | Meinke et al. | |
| 6,991,277 B1 * | 1/2006 | Esler | 296/50 |
| 2003/0127875 A1 * | 7/2003 | Hornick | 296/32 |
| 2007/0024074 A1 * | 2/2007 | Harrison | 296/3 |
| 2007/0262602 A1 * | 11/2007 | Nagle | 296/51 |

* cited by examiner

*Primary Examiner* — Glenn Dayoan
*Assistant Examiner* — Melissa A Black
(74) *Attorney, Agent, or Firm* — Ronald L. Hofer

(57) ABSTRACT

A tailgate topper for a pickup truck tailgate has a transverse horizontally extending cross-bar supported by a pair of vertically movable support members which allow positioning of the cross-bar at a desired height above the tailgate. A plurality of upwardly biased popup blocks are disposed below said cross-bar within the tailgate so exert pressure upwardly against cargo extending between the cross-bar and the popup block.

14 Claims, 5 Drawing Sheets

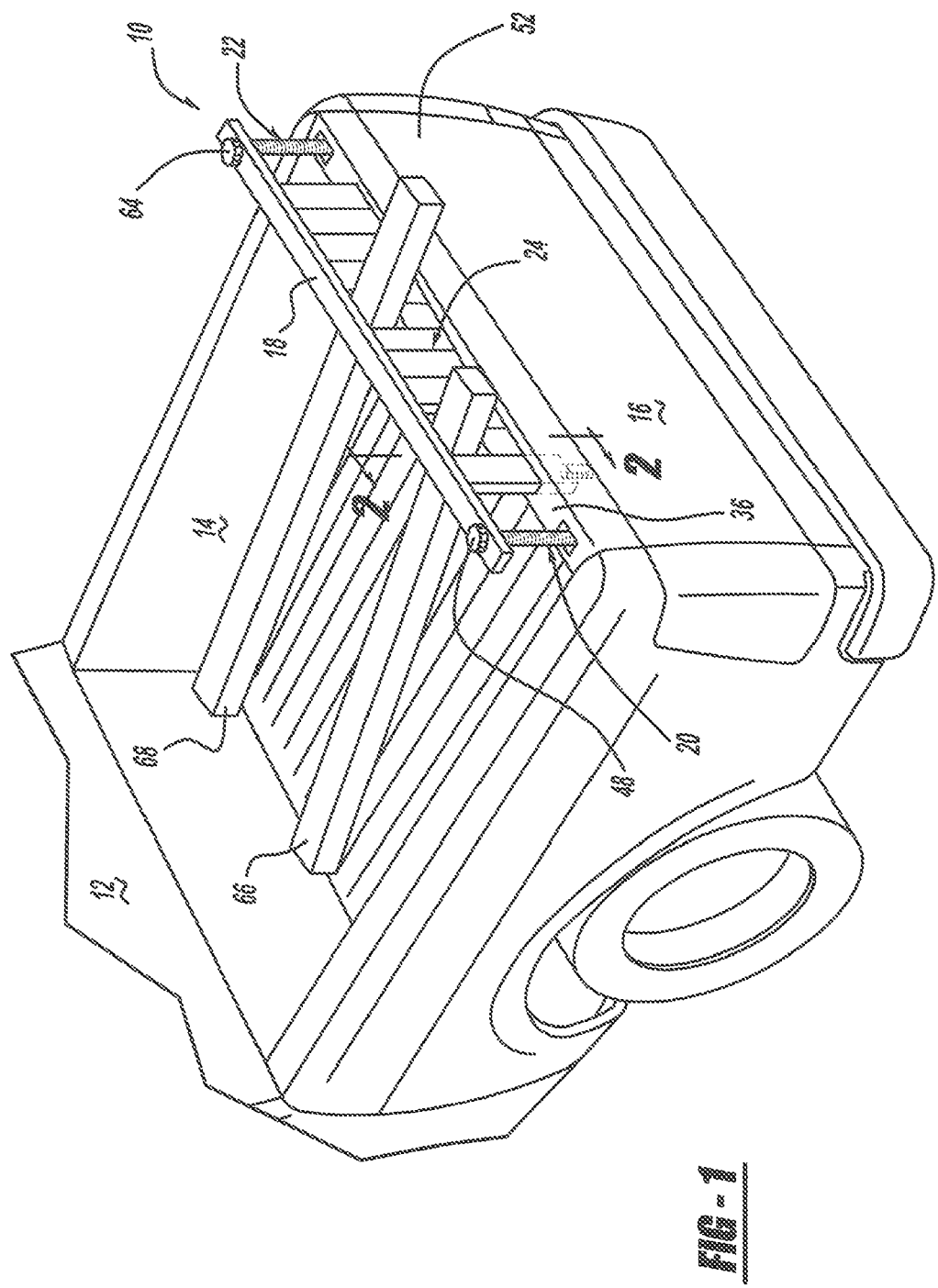

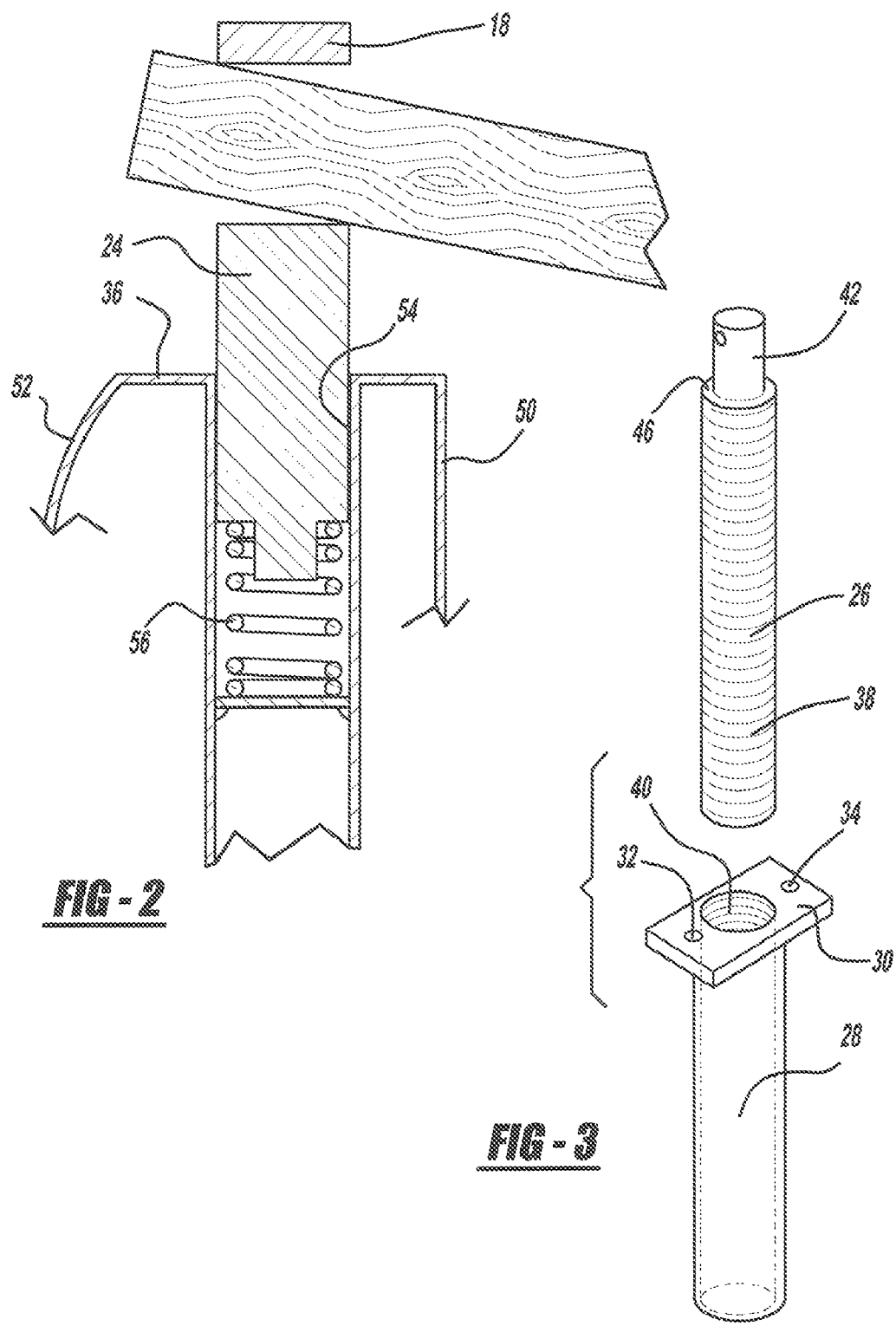

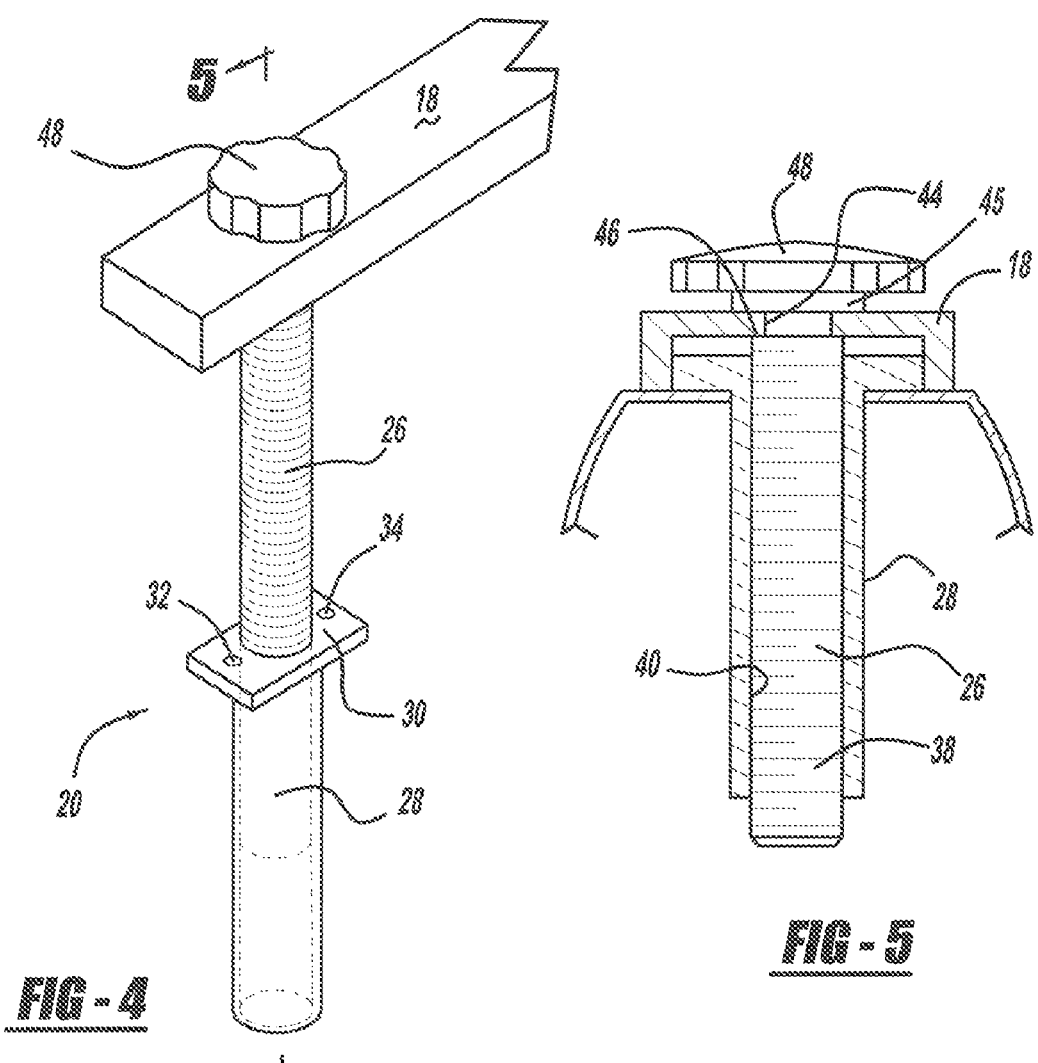
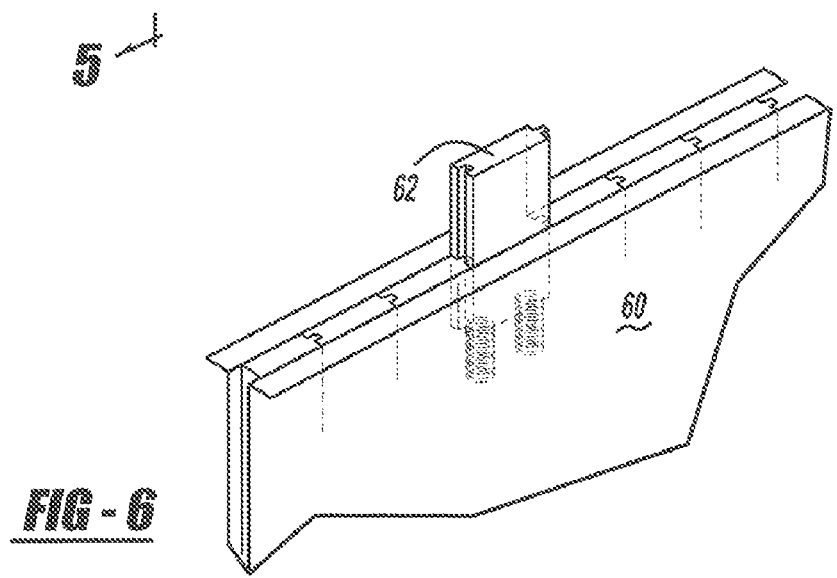

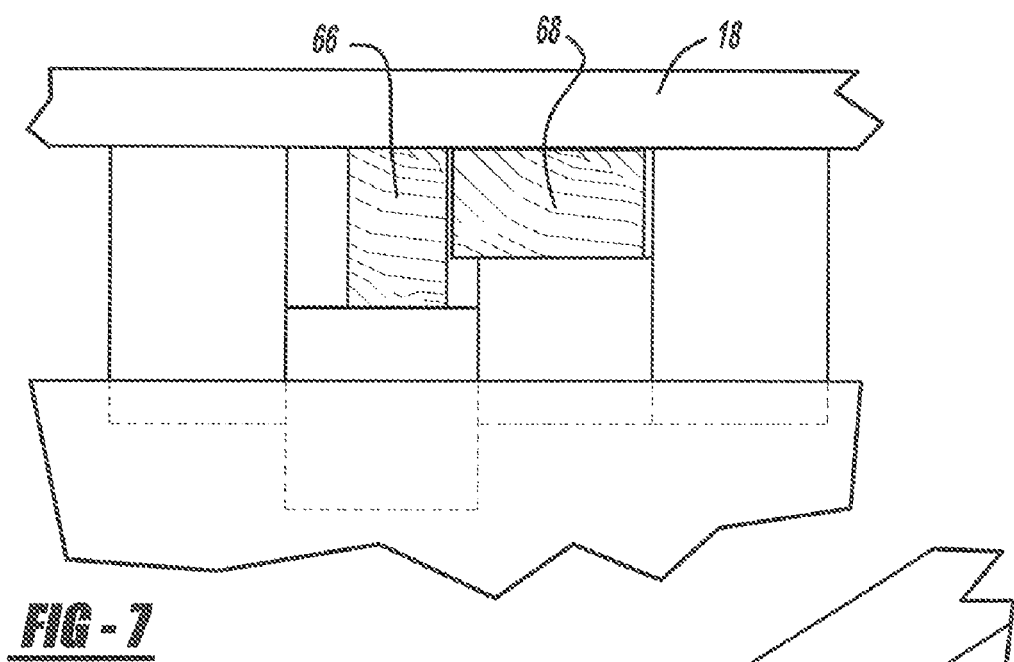
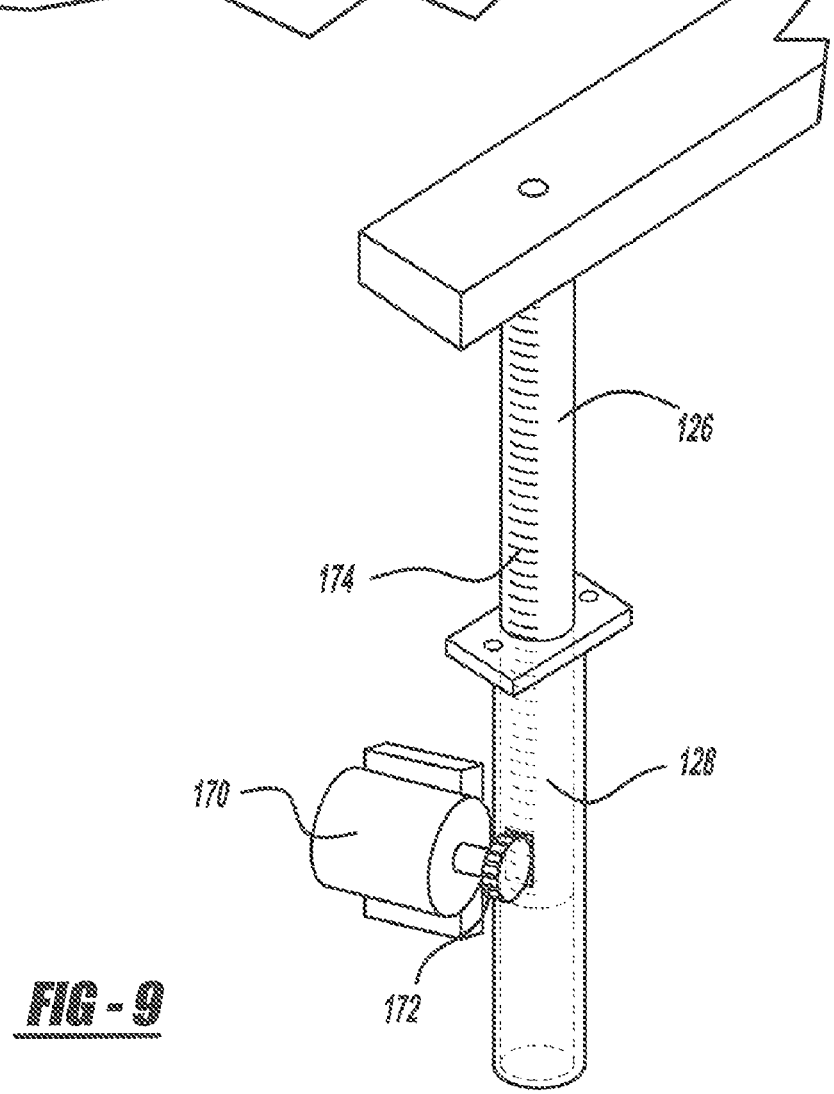

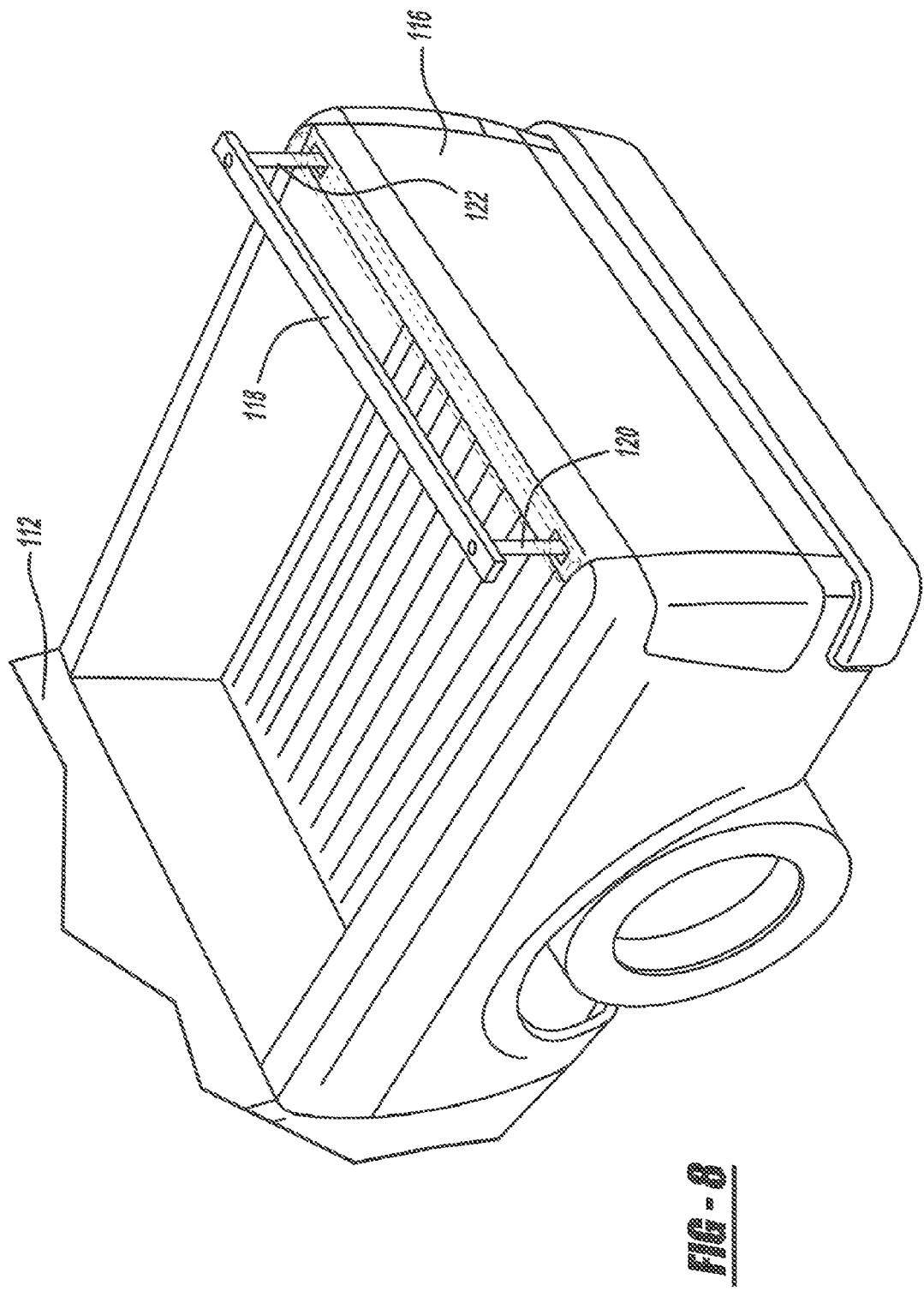

TAILGATE TOPPER

BACKGROUND OF THE INVENTION

The present invention relates to a vehicle tailgate such as a tailgate for a pickup type motor vehicle. More particularly, the present invention relates to a tailgate that has a system for restraining cargo extending beyond the tailgate.

Pickup trucks are light trucks with an open body or cargo box having low sides and a tailgate. Pickup trucks are popular vehicles and are well adapted for transporting a variety of cargo including boards, conduit and other elongated items. The tailgate is at the rearward end of the cargo box and is adapted to be lowered or pivoted to one side to facilitate loading or off-loading of cargo and to be raised or pivoted to a closed position to thereby retain cargo in the box during the transportation of the cargo. Sometimes, however, the cargo is too long to fit within the length of the cargo box. In many cases long cargo can be transported by the pickup truck by positioning the cargo mostly inside the cargo box but with one end portion of the cargo resting on top of, and extending beyond, the tailgate.

The practice of extending cargo beyond the length of a pickup truck cargo box in order to carry it is well known. Also well known are problems associated with the practice such as the problem of supporting the cargo during its transport while it extends beyond the cargo box. Tailgate extenders are known in the art for the purpose of supporting long cargo. For example, U.S. Pat. No. 6,935,671 Aug. 30, 2005 to Bruford et al. for "Vehicle Tailgate with Supplemental Tailgate Having Vertical Extension Mode" discloses a vehicle which has a tailgate with a supplemental tailgate that retracts within the tailgate and is extendable therefrom in order to provide different assist functions. Other tailgate extenders or auxiliary tailgates are disclosed in U.S. Pat. Nos. 6,364,392 Apr. 2, 2002 to Meinke for "Tailgate Extender"; 6,932,404 Aug. 23, 2005 to Vejnar for "Retractable Auxiliary Tailgate"; and 6,988,756 Jan. 24, 2006 to Meinke et al. for "Modular Extender Tailgate."

Another problem associated with the practice of transporting long cargo with pickup trucks is that of restraining the cargo to keep it in the bed while the truck is traveling over a rough road or uneven terrain. Although tailgate extenders are useful to provide support for long cargo items, there remains a need for a tailgate topper or system which has improved features the restraining cargo extending beyond the tailgate during its transportation. There also remains a need for a tailgate topper which can be provided during the original manufacture of the tailgate but can also be retrofit onto a tailgate after its manufacture. Still further, there remains a need for a tailgate topper which is easily used and can readily adapt to support and restrain cargo of different heights. And, of course, there remains a need for tailgate systems which are practical and economical to manufacture.

Accordingly, the present invention provides a tailgate system which has improved features for restraining long cargo. The present invention also provides a tailgate topper which readily supports and/or restrains long cargo of different heights or thicknesses. Still further, the present invention provides a tailgate topper that can be economically incorporated into the original manufacture of a tailgate or retrofit onto an already manufactured tailgate. These and other advantages and features of the present invention will be apparent from the following disclosure and claims taken in conjunction with the accompanying drawings.

SUMMARY OF THE INVENTION

In accordance with the present invention, a preferred embodiment of a pickup truck tailgate has a tailgate topper comprising a cross-bar supported by an adjustable vertical support assembly which is adapted to provide a clamping force on cargo between the cross-bar and an upper surface of the tailgate. A preferred embodiment of a tailgate topper system of the present invention has a cross-bar supported by an adjustable vertical support assembly and has a plurality of popup blocks spring biased upwardly against the cross-bar. Another preferred embodiment of he present invention is a kit for modifying an OEM tailgate, the kit comprising a cross-bar, vertical support assembly and a module having a plurality of spring biased popup blocks.

BRIEF DESCRIPTION OF THE DRAWINGS

FIG. 1 is a perspective view, broken away, showing a pickup truck with a preferred embodiment of a tailgate of the present invention and showing the tailgate topper constraining long boards;

FIG. 2 is a sectional view, broken away, taken along line 2-2 in FIG. 1;

FIG. 3 is an exploded view showing parts of a vertical support assembly of FIG. 1;

FIG. 4 is a perspective view, broken away, showing the vertical support assembly and horizontal crossbar of the embodiment of FIG. 1;

FIG. 5 is a sectional view, broken away, taken along lien 5-5 in FIG. 4;

FIG. 6 is a perspective view, broken away, showing a preferred embodiment of a pop-up block module of the present invention;

FIG. 7 is a rear elevational view, broken away, further illustrating the use of a tailgate topper of the present invention to constrain long boards;

FIG. 8 is a perspective view, broken away, showing a pickup truck with an alternative preferred embodiment of a tailgate of the present invention with an alternative tailgate topper; and FIG. 9 is a perspective view, broken away, showing the vertical support element and horizontal crossbar of the embodiment of FIG. 7.

DETAILED DESCRIPTION OF THE INVENTION

Now referring to FIG. 1, a preferred embodiment of a tailgate topper of the present invention is indicated generally by the numeral 10 and is shown in combination with pickup truck 12. Broadly speaking, pickup truck 12 has a cargo box 14 with a tailgate 16 extending transversely across the rear opening of cargo box 14. Cargo box 14 is the payload or cargo area of pickup truck 12 and may be an open or closed cargo box but is illustrated herein as an open cargo box. Pickup truck 12, cargo box 14 and tailgate 16 are conventional in the art except that tailgate 16 includes tailgate topper 10 of this invention which is described in more detail below.

Tailgate topper 10 generally comprises an elongated horizontally extending cross-bar 18 which is supported by a pair of vertical support assemblies, 20 and 22 and preferably includes a plurality of popup blocks 24. Vertical support assembly 20 has a vertical support rod 26 and vertical support tube 28. An attachment plate 30 is welded or otherwise attached to the upper end of vertical support rod 26. Attachment plate 30 has holes 32 and 34 and is secured to upwardly facing panel 36 of tailgate 16 by screws or other fastening elements extending through holes 32 and 34 and into panel 36. Of course, attachment plate 30 can be otherwise attached to tailgate 16 such as by welding or the like and the lower end of vertical support tube 28 can be anchored to tailgate 16 for further stability if desired.

Vertical support rod 26 has external threads 38 and vertical support tube 28 has internal threads 40. Vertical support rod 26 is threadably located within vertical support tube 28 so that rotation of vertical support rod 26 effects a raising or lowering of vertical support rod 26 with respect to vertical support tube 28 to thereby raise or lower cross-bar 18. Upper end portion 42 of vertical support rod 26 extends through hole 44 in horizontal crossbar 18 which is supported on shoulders 46 of vertical support rod 26. Knob 48 is attached to upper end portion 42 of vertical support rod 26 by a set screw (not shown) or the like and has shoulder 45 which exerts a downward force on cross-bar 18 when vertical support rod 26 is lowered into clamping relationship with cargo or the top surface of tailgate 16. Manipulation, i.e., rotation of knob 48 by the user thus raises or lowers vertical support rod 26 and hence cross-bar 18 with respect to tailgate 16.

Vertical support assembly 22 is analogous to vertical support assembly 20. Of course, it is intended that vertical support assemblies 20 and 22 will be manipulated in cooperation with each other to obtain the desired height of cross-bar 18. Also, it will be appreciated by those skilled in the art that while the present embodiment is illustrated with two vertical support assemblies 20 and 22, tailgate topper 10 may comprise three or more vertical support assemblies if desired.

Tailgate topper 10 also includes a plurality of spring biased popup blocks 24 which are adapted to project upwardly from tailgate 16 when cross-bar 18 is raised. As best shown in FIGS. 1 and 2, tailgate 16 has front panel 50 and rear panel 52 between which is hollow interior 54. Of course, tailgate 16 can have a variety of designs within the scope of the present invention. Thus, pickup trucks, cargo boxes and tailgates of various sizes and shapes can be used in combination with a tailgate topper of the present invention. Popup blocks 24 are disposed within hollow interior 34 when in the down position but are biased upwardly towards cross-bar 18 by springs 56. Popup blocks 24 are slidably disposed with respect to each other and can have a tongue and groove arrangement as is illustrated in FIG. 6. Upward movement of popup blocks 24 can be limited by limited spring length or other means so that cross-bar 18 can be raised above popup blocks 24 if desired. Also, popup blocks 24 can optionally have a look/release mechanism to allow a user to selectively release the blocks to allow their upward movement. It is preferred that popup blocks 24 will be biased upwardly to clamp cargo between the top of a block underneath the cargo and the cross-bar as is illustrated in FIGS. 1 and 7. Of course, if the weight of the cargo exceeds the upward force of the spring or springs of the particular popup block or blocks underneath the cargo, the cargo will rest on top of the tailgate and be clamped in place by the cross-bar. In such a case, adjacent popup blocks will provide lateral restrictions against the cargo to prevent unwanted sideways movement of the cargo.

Popup blocks 24 can be provided within tailgate 16 as shown in FIGS. 1-5 or can be provided in the form of a popup block module as illustrated to FIG. 6. Thus, popup block module 60 carries a plurality of spring biased popup blocks 62 which are vertically slidably disposed with respect to each other and module 60. Popup blocks 62 have a tongue and groove arrangement as shown in FIG. 6.

Further understanding of the present invention will be had from the following description of its use. It is intended that the tailgate topper 10 will be used in conjunction with the transport of long objects such as long boards which will extend beyond the length of truck bed 14 and which may be carried as illustrated in FIG. 1 by extending one end of the boards over and beyond tailgate 16. In use of tailgate topper 10, cross-bar 18 is raised by manipulating knobs 48 and 64 to a position above the top of popup blocks 24. Then, boards 66 and 68 are loaded into bed 14 by extending them between cross-bar 18 and popup blocks 24. Preferably, but not necessarily, springs 56 are sufficiently strong to support the ends of boards 66 and 68. Then cross-bar 18 is lowered down to boards 66 and 68. Preferably, cross-bar 18 is lowered to the position shown in FIG. 7 where boards 66 and 68 are shown well constrained against unwanted movement during transport.

Now referring to FIG. 8, an alternative preferred embodiment of the present invention is shown in operative association with pick-up truck 112 and tailgate 116 and is indicated generally by the numeral 110. Tailgate topper 100 broadly comprises elongated horizontally extending cross-bar 118 which is supported by a pair of vertical support assemblies, 120 and 122, and has plurality of popup blocks 124 analogous to those of tailgate topper 10. As best shown in FIG. 9, vertical support assembly 120 has a vertical support rod 126 and vertical support tube 128. Cross-bar 118 is supported by vertical support rod 126 in a manner analogous to that of tailgate topper 10; however, vertical support assembly 120 is adapted to be electrically operated. Thus, vertical support assembly 120 has a DC electric motor 170 which drives a gear 172 with teeth engaging corresponding gear teeth 174 in vertical support rod 126. Vertical support assembly 122 is of a construction analogous to that of vertical support assembly 120 and it is intended that the motors of both assemblies will operate simultaneously to raise or lower cross-bar 118. A suitable switch to control the motors can be provided on the tailgate or elsewhere in the vehicle.

While the above invention has been disclosed in the context of preferred embodiments, it will be appreciated that the invention is subject to modification and variation and such modifications and variations are within the broad scope of the present invention. Thus, the number of popup blocks may be varied as well as their installation. For example, the popup block module may be installed within the tailgate or on a front or rear face of the tailgate. Also, the number and types of springs and their spring force may be varied. Of course, the number of vertical support assemblies may be modified. Therefore, it is intended that the present invention is to be limited only by the following claims.

What is claimed is:

1. A tailgate topper for a pickup truck having a tailgate, the tailgate topper comprising:
   (A) a transverse, horizontally extending cross-bar;
   (B) a vertical support having one end secured to said horizontal cross-bar and another end adapted to be secured to said tailgate; and
   (C) a plurality of popup blocks adapted to be disposed within said tailgate below said horizontal cross-bar, said blocks being spring biased upwardly toward said cross-bar and capable of providing a clamping force thereagainst.

2. A tailgate topper as in claim 1, wherein said vertical support has a pair of vertical rods each disposed within a tube and being vertically movable therein, each of said tubes adapted to be secured to said tailgate and each of said rods adapted to be secured to said horizontal cross-bar.

3. A tailgate topper as in claim 2 wherein each said vertical rod is threadably secured within said tube and height of said horizontal bar with respect to said tailgate is adjusted by rotating said rod.

4. A tailgate topper as in claim 2 wherein each said vertical rod is slidably secured within said tube.

5. A tailgate topper as in claim 1 including an electrical motor operatively related to said vertical rod to adjust the height thereof with respect to said tailgate.

6. A tailgate topper as in claim 2 wherein said blocks are slidably associated relative to each other in a tongue and groove arrangement.

7. A tailgate topper as in claim 2 wherein said vertical support is sized to extend said horizontal cross-bar higher than said blocks extend upwardly when in their highest vertical position.

8. A tailgate system for a pickup truck comprising a tailgate and:
   (A) a transverse, horizontally extending cross-bar extending substantially across said tailgate and extendable above said tailgate;
   (B) a vertical support having one end secured to said horizontal cross-bar and another end secured within and to said tailgate, said vertical support including a rotatable element for applying force in a downward direction towards said tailgate, said rotatable element being continuously adjustable, said vertical support having a pair of vertical rods each disposed within a tube and being vertically movable therein, each of said tubes adapted to be secured to said tailgate and each of said rods adapted to be secured to said horizontal cross-bar; and
   (C) a plurality of popup blocks disposed within said tailgate below said cross-bar, said blocks being upwardly spring-biased wherein said blocks are slidably associated relative to each other in a tongue and groove arrangement.

9. A tailgate system as in claim 8 wherein said vertical support is sized to extend said horizontal bar higher than said blocks extend upwardly when in their highest vertical position.

10. A tailgate topper kit for modifying a tailgate of a pickup truck, said tailgate having a width and said kit comprising:
    (A) an elongated horizontal cross-bar, said cross-bar being substantially as elongated as the width of said tailgate;
    (B) a vertical support assembly adapted to be installed within said tailgate; and
    (C) a plurality of popup blocks with springs, said springs being adapted to bias said blocks in a sliding vertical direction towards said cross-bar.

11. A tailgate topper kit as in claim 10, wherein said vertical support assembly has a pair of vertical rods each adapted to be disposed within a tube and being vertically movable therein, each of said tubes adapted to be secured to a tailgate and each of said rods adapted to be secured to said horizontal cross-bar.

12. A tailgate topper kit as in claim 11 wherein each said vertical rod is threadably secured within said tube.

13. A tailgate topper kit as in claim 11 wherein each said vertical rod is slidably secured within said tube and including an electrical motor adapted to drive said rod within said tube.

14. A tailgate topper kit as in claim 10 wherein said blocks are slidably associated relative to each other in a tongue and groove arrangement and are carried in a module.

* * * * *